United States Patent [19]

Hoffmann et al.

[11] Patent Number: 5,674,081
[45] Date of Patent: Oct. 7, 1997

[54] ROTARY CONTACTOR FOR A MOTOR VEHICLE

[75] Inventors: Bertrand Hoffmann, Chilly Mazarin; Thierry Lecomte, Evry, both of France

[73] Assignee: Valeo Electronique, Creteil, France

[21] Appl. No.: 446,820

[22] PCT Filed: Sep. 20, 1994

[86] PCT No.: PCT/FR94/01092

§ 371 Date: Jun. 1, 1995

§ 102(e) Date: Jun. 1, 1995

[87] PCT Pub. No.: WO95/09744

PCT Pub. Date: Apr. 13, 1995

[30] Foreign Application Priority Data

Oct. 1, 1993 [FR] France ............... 93 11730

[51] Int. Cl.⁶ ........................................... H01R 35/04
[52] U.S. Cl. .................................... 439/164; 439/15
[58] Field of Search ........................... 439/15, 164

[56] References Cited

U.S. PATENT DOCUMENTS

| | | | |
|---|---|---|---|
| 4,610,564 | 9/1986 | Vantouroux | 403/316 |
| 4,660,500 | 4/1987 | Zeller et al. | 116/31 |
| 4,722,690 | 2/1988 | Priede | 439/15 |
| 4,886,460 | 12/1989 | Olgren | 439/15 |
| 4,975,064 | 12/1990 | Takahashi et al. | 439/164 |
| 5,171,157 | 12/1992 | Bolen | 439/164 |
| 5,248,260 | 9/1993 | Ida et al. | 439/164 |
| 5,328,378 | 7/1994 | Persson et al. | 439/15 |
| 5,334,023 | 8/1994 | Schauer et al. | 439/164 |
| 5,429,517 | 7/1995 | Bolen | 439/164 |

FOREIGN PATENT DOCUMENTS

| | | |
|---|---|---|
| 0195833 | 10/1986 | European Pat. Off. . |
| 479567 | 4/1992 | European Pat. Off. . |
| 0525839 | 2/1993 | European Pat. Off. . |
| 2612851 | 9/1988 | France . |
| 3436968 | 4/1986 | Germany . |
| 91-17592 | 11/1991 | WIPO . |

*Primary Examiner*—Gary F. Paumen
*Attorney, Agent, or Firm*—Longacre & White

[57] ABSTRACT

The rotary contactor comprises a first part, referred to here for convenience as the fixed part (101), which is adapted to be fixed to the steering column (4), together with a second part, referred to here for convenience as the moving part (102) and adapted to be coupled in rotation to the steering wheel (7) of the motor vehicle. For the temporary coupling of the fixed part (101) in rotation with the moving part (102), retractable locking devices (83, 84) are interposed between the parts (101, 102). These means comprise a retractable first member (8) carried by the moving part (102) and adapted to engage with a second member (40) carried by the fixed part (101), with the first member including a manoeuvrable portion (82) which is adapted to be manoeuvred by the steering wheel (7).

9 Claims, 2 Drawing Sheets

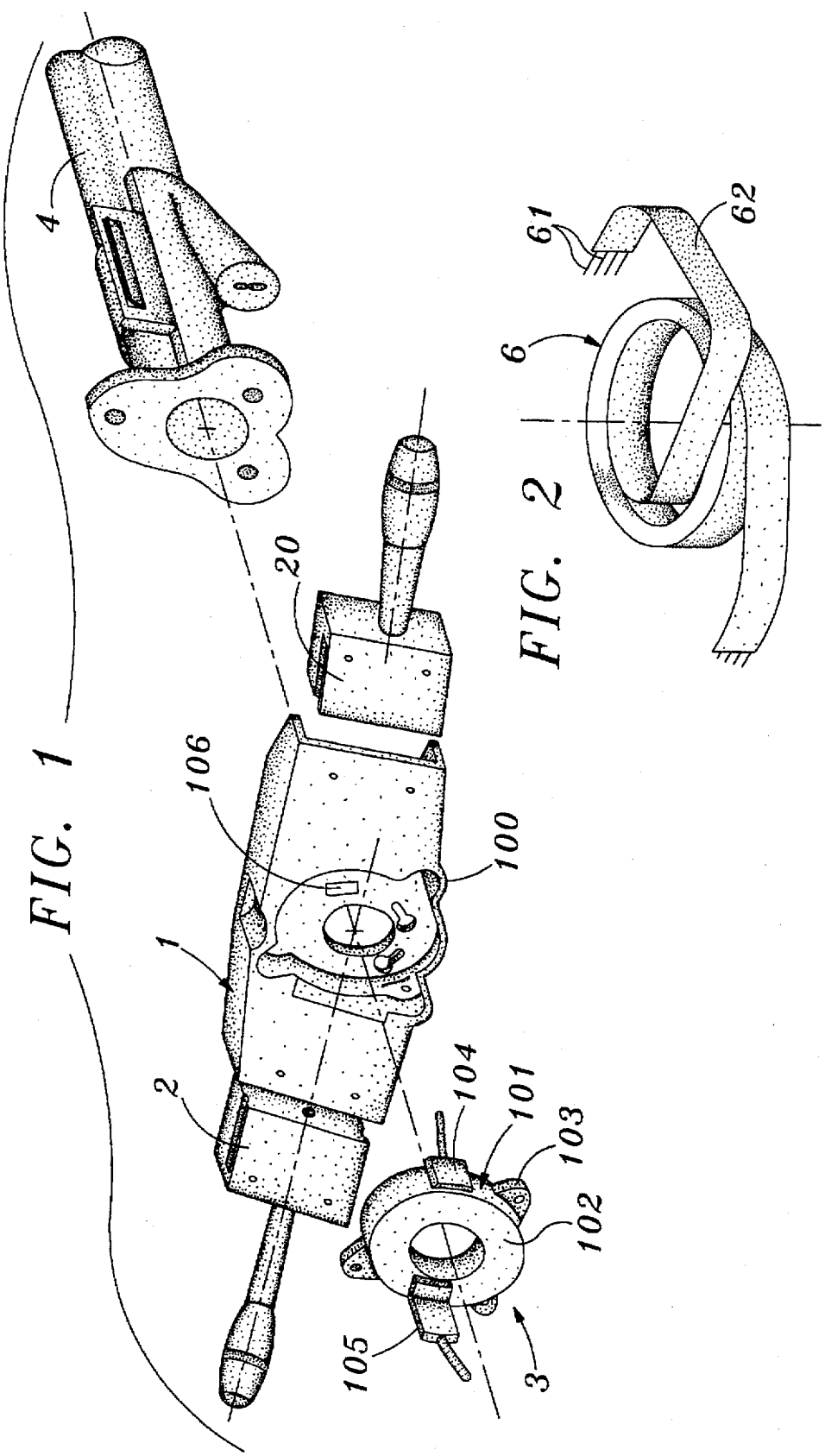

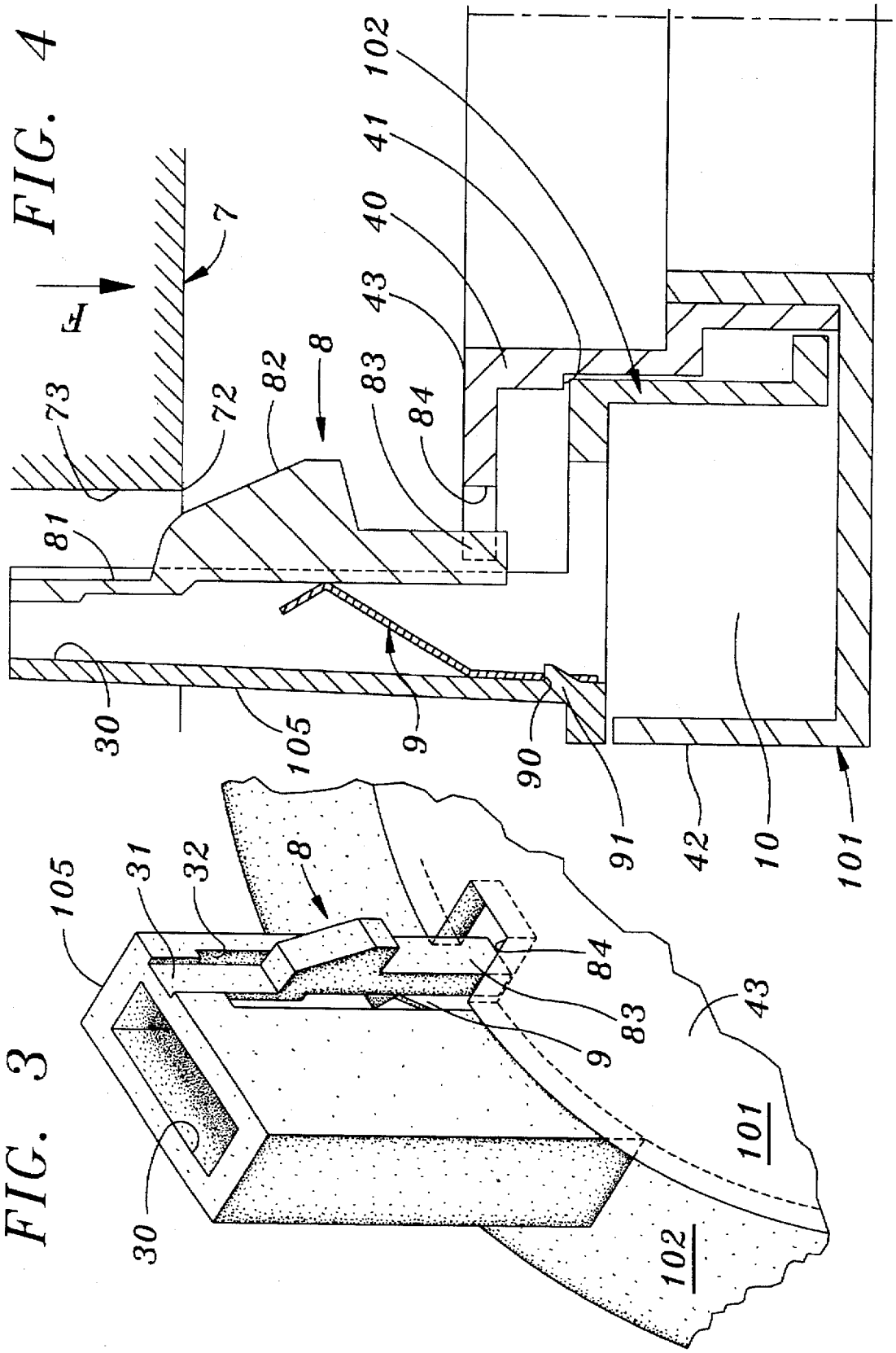

ROTARY CONTACTOR FOR A MOTOR VEHICLE

BACKGROUND OF THE INVENTION

1. Field of the Invention

The present invention relates to rotary contactors for motor vehicles, of the kind comprising two coaxial parts mounted for movement with respect to each other, with electrical transmission means being interposed between the two coaxial parts.

2. Description of Related Art

Such rotary contactors are described for example in the documents EP-A-0 479 567 and FR-A-2 612 851.

Commonly (FIG. 1), one of the above mentioned parts of the contactor 3, referred to for convenience as the fixed part 101, is adapted to be fixed to the steering column 4 of the vehicle, while the other one of the said parts, referred to here for convenience as the moving part 102, is adapted to be coupled to the steering wheel of the motor vehicle for rotation with the latter.

It will be recalled that the electrical transmission means enable a device, or first devices, connected to the steering wheel of the vehicle, to be connected electrically to a device, or to second devices, which are connected to the steering column 4, or to the chassis, of the vehicle.

The first devices may consist for example of electrical contactors, such as the horn, or a safety device with an inflatable cushion known as an "air bag" which is inflated in the event of an accident, so as to protect the vehicle.

These transmission means, which are for example in the form of a tape wound between the two parts 101 and 102, enable the steering wheel to execute 1.75 to 3.5 turns in either direction.

This rotary contactor is made by an equipment manufacturer and is delivered to the constructor of the vehicle so that it can be fitted in the said central portion of the switch carrier 1.

To this end, the rotary contactor must be delivered in its mean or central setting so that the number of turns of the steering wheel required can be performed without damage to the contactor. Commonly, in this connection, the parts 101 and 102 are held in this predetermined setting, for example, with the aid of mechanical means which employ, for example, a stop screw.

In a modification, this retention is obtained by means of an adhesive label which is torn during the initial rotation of the steering wheel.

Thus, the contactor is mounted in the correct position and does not run any risk of damaging the electrical transmission means, especially when the latter comprise a tape which is spiral wound between the two parts of the contactor.

These arrangements are not entirely satisfactory.

In this connection, in the case where the mean position is ensured by means of screws, this makes it necessary for the vehicle manufacturer to carry out an additional operation.

Where retention in the mean position is obtained by means of an adhesive label, there is a risk of tearing the latter as a result of rough handling, so that this arrangement is not fully reliable.

An object of the present invention is to overcome these drawbacks in a simple and inexpensive way.

SUMMARY OF THE INVENTION

In accordance with the invention, a rotary contactor of the type described above is characterised in that, for temporary coupling of the fixed part in rotation with the movable part, retractable locking means are arranged between the parts, and in that the locking means comprise a retractable first member carried by the moving part and adapted to engage with a second member carried by the fixed part, the first member comprising a manoeuvrable portion adapted to be actuated by the steering wheel of the vehicle so as to retract the said first member and release the said parts from each other.

Thanks to the invention, in which the first member constitutes a retractable stop member, the rotary contactor can be delivered in its mean setting and the vehicle manufacturer has no additional operation to carry out, since unlocking of the two parts of the rotary contactor, for rotation with respect to each other, is carried out automatically as the steering wheel is fitted. By virtue of the manoeuvrable portion, the first member is subsequently held in its retracted position by the steering wheel.

It will be appreciated that this arrangement is very reliable and very simple. In addition, it enables assembly times to be reduced. Besides this, in one embodiment, the first member is easily made by moulding of the component that carries it, without the number of components being increased.

According to a feature, the manoeuvrable portion is in the form of a ramp.

By virtue of this arrangement, manufacturing tolerances can be taken into account, which enables an ideal position of the steering wheel, in terms of height with respect to the rotary contactor, to be obtained, with a guarantee that the stop member will be unlocked once the steering wheel has been fitted.

According to another feature, the retractable first member is elastic, or is subjected to the action of axially acting resilient means which urge it towards the second member so as to hold it in engagement with the second member.

For example, the second member preferably has, for this purpose, a multiplicity of notches for receiving the retractable member and for locking the parts together.

One of the notches corresponds to the mean position of the rotary contactor, and is preferably identified, for example with the aid of a mark.

Because of this arrangement, repairs to the vehicle involving the steering wheel, for example in a garage, can easily be carried out. In this connection it is possible to remove the steering wheel and then refit it, without any risk of thereby damaging the electrical transmission means of the rotary contactor, due to the elasticity of the first member or the action of the axially acting resilient means, the said first member once again engaging with the second member when the steering wheel is removed during the working life of the vehicle.

In a modification, it is possible to provide a coupling of the ratchet type. In all cases, the locking means in accordance with the invention involve a minimum number of components.

In one embodiment, the first member is coupled in rotation with the second member in a disengageable manner by mating cooperation.

This coupling may for example be of the tenon and mortice type.

For example, the first member may be articulated on a drive block which is commonly provided on the moving part, with the fixed part then having a component formed with a notch which is arranged to receive a projection fixed to the first member.

BRIEF DESCRIPTION OF THE DRAWINGS

The following description illustrates the invention with reference to the attached drawings, in which:

FIG. 1 is a perspective view of a rotary contactor adapted to be fitted in a switch carrier fixed to the steering column of the vehicle;

FIG. 2 is a perspective view of one embodiment of the electrical transmission means;

FIG. 3 is a partial perspective view of the retractable locking means in accordance with the invention;

FIG. 4 is a view, in axial cross section, of the locking means of FIG. 3.

DETAILED DESCRIPTION OF PREFERRED EMBODIMENT

The drawings show a rotary contactor for a motor vehicle, of the kind comprising two coaxial parts 101, 102 which are mounted for movement with respect to each other, with electrical transmission means 6 being interposed between the said parts, namely a first part 101 referred to here for convenience as the fixed part, which is adapted to be fixed to the steering column 4 of the vehicle, and a second part 102, referred to here for convenience as the moving part, which is adapted to be connected in rotation to the steering wheel 7 of the motor vehicle.

In this example the fixed part 101 is fixed to the steering column 4 via a carrier 1 for switches 2, 20 which are located behind the steering wheel 7.

This switch carrier 1 is fixed to the column 4, for example by means of screws or other fasteners, and has a central recess for accommodating the contactor 3.

The fixed part 101 is fixed to the switch carrier 1, for example by being clipped thereto, or in any other way, for example by riveting or by screws or otherwise. For example in FIG. 1, the fixed part 101 has fastening ears 103 which extend into complementary recesses 100 of the switch carrier 1, and which are secured to the switch carrier 1 by screws or by riveting.

The moving part 102 has an axially orientated projection, through which it can be driven in rotation by the steering wheel 7. This may for example comprise a pin penetrating into a complementary aperture formed in a component which is fixed to the steering wheel 7.

In this example, the electrical transmission means comprise a tape 6 which has electrically conducting wires 61 encased in electrical insulation 62. The tape 6 is wound in a spiral like a watch spring, with the parts 101 and 102 being movable with respect to each other against the tape.

The said tape 6 thus enables electrical connections to be made and also signals to be transmitted. Accordingly, it is for simplicity that the means 6 are referred to here as electrical transmission means.

The ends of the tape 6 extend in this example into hollow blocks 104 and 105, which are orientated axially and formed respectively in the fixed part 101 and moving part 102. To this end, the switch carrier 1 has a passage 106 for accommodating the hollow block 104. The hollow block 105 in this example constitutes the drive projection of the moving part 102.

The block 105 may of course not have the relevant end of the tape 6 passing into it, and may serve only for driving the moving part 102. In that case, the end of the tape 6 leads to another location on the moving part 102.

The tape 6 is mounted in a cavity 10 (FIG. 4) which is defined between the moving parts 101 and 102 in a manner described below.

In the interests of clarity, the tape is not shown in FIG. 4.

The electrical transmission means may of course take another form, and be of the same type as those described in the document FR-A-2 612 851. In a modification, it may consist of a copper band, spirally wound between the two parts 101, 102 of the rotary contactor 3.

All forms of electrical transmission means may be envisaged.

For more details, reference should be made to the above mentioned documents.

In accordance with the invention, a rotary contactor of the type described above is characterised in that, for the purpose of temporary coupling of the fixed part 101 in rotation with the moving part 102, retractable locking means 83, 84 are arranged to act between the said parts 101, 102, and in that the said means comprise a retractable first member 8 carried by the moving part 102 and arranged to engage with a second member 40 carried by the fixed part 101, the said first member comprising a manoeuvrable portion 82, which is adapted to be manoeuvred by the steering wheel 7 of the vehicle so as to retract the said first member and release the said parts from each other.

By virtue of this arrangement, and as can be seen from FIG. 4, the block against rotation is released when the steering wheel is being fitted in position, in which connection the element 72, which is fixed to the said steering wheel, is displaced in the direction of the arrow F and then makes contact with the manoeuvrable portion 82, which causes the first member 8 to be retracted as the movement of the steering wheel is continued.

After the steering wheel has been fitted, the element 72 remains in contact with the portion 82, so that the first member 8, constituting a stop member, is retracted and escapes from the second member 40. The parts 101, 102 are then free to rotate with respect to each other, with the member 8 rotating in unison with the steering wheel 7.

In this embodiment, the first member 8 is carried by, and articulated on, the moving part 102, and projects axially with respect to the fixed part 101 and moving part 102. This member is in this example integral with the hollow block 105.

To this end, the hollow block 105 is preferably made of plastics material, and the same is true for the assembly of the fixed part 101 and moving part 102. The said hollow block 105 is arranged to penetrate into a complementary aperture 73 in the steering wheel 7, so as to couple the moving part 102 in rotation with the steering wheel 7.

The hollow block 105 thus constitutes a drive block (which in this example is in the form of a parallelepiped), and has a rectangular central passage 30 for the terminal connection portion of the tape 6.

The said first member 8 is arranged and formed in a longitudinal slot 32 (extending axially), which is formed in the block 105. The member 8 is articulated on the block 105, in this example at the outer periphery of the latter, in such a way that it has a substantial length and is flexible. More particularly, the member 8 has a root zone 81 in the form of a thin hinge, joining it to the block 105.

In this example this thin hinge is obtained by reducing the thickness of the block 105 in a groove 31 formed in the outer peripheral portion of the latter, and then by further reducing the thickness.

The manoeuvrable portion 82 of the member 8 is wedge-shaped and defines a ramp. The free end portion 83 of the member 8, having a rectangular cross section, is adapted to be engaged in a complementary notch 84 which is formed in a member 40 that is part of the fixed part 101.

In practice, a multiplicity of notches 84 are provided, so as to enable the steering wheel to be dismounted and the contactor to be locked generally in its position before the steering wheel is removed. One of the notches 84 corresponds to the mean position of the rotary contactor, and is preferably identified by a mark.

More precisely, the width of the free end portion 83, which is a finger in the form of a parallelepiped, is generally equal to that of the notch 84, with a larger clearance existing in the horizontal direction of FIG. 4.

This member 40, which is annular like the parts 101 and 102, has a central stepped sleeve with a shoulder 41. It is joined, for example adhesively or by screwed fastening or in any other way, to an annular member 42, which has a U-shaped cross section and is provided with a central sleeve. The sleeve of the member 40 is fitted over the central sleeve of the member 42, and is joined to the latter. The notches 84 are formed at the outer periphery of an annular plate element 43 which extends at right angles to the sleeves of the members 40, 42 and at right angles to the block 105, at the outer periphery of the member 40.

The member 42 defines, with the moving part 102, the cavity 10 which, in this example, is of rectangular cross section, and within which the tape 6 is confined, while the second member 40, by virtue of its shoulder 41, enables the moving part 102 to be located axially and constitutes a cover.

The member 8 is acted on by a spring 9 which bears on the block 105, and which urges the said first member 8 towards the second member 40 so as to hold it in contact with the said member 40, in particular in a storage position of the contactor 3, that is to say before it is fitted or refitted in the vehicle.

The spring 9 thus acts between the member 8 and the drive projection 105 of the moving part 102. This spring is for example a coil spring, the ends of which are mounted in recesses which are formed respectively in the appropriate internal surface of the aperture 30 and in the facing surface of the member 8.

In FIGS. 3 and 4, the spring 9 consists of a resilient leaf, one end of which is hooked on to the block 105, while its free end has a pointed portion, in this example V-shaped, for making point contact with the member 8, with the two ends of the spring 9 being connected together through an inclined portion. In a modification, the spring 9 is attached by clipping.

The free end of the spring 9 may of course be dimpled so as to make point contact with the member 8.

Another method of fastening, such as screwing, riveting or otherwise may of course be used.

The said spring 9 is mounted in the passage 30 and accordingly has at its inner end a hole 90 for engagement on an internal projection 91, which is formed in the interior of the block 105 at its base for hooked attachment of the spring 9. The spring is of spring steel for example, and accordingly extends from one longitudinal edge to the other longitudinal edge of the aperture 30. It is fitted close to one of the side edges of the aperture 30, as is the member 8, so as to leave room for the ends of the tape.

Thus, because of the spring 9, the free end 83 is able to penetrate with complete certainty into the corresponding notch 84 (possibly after a slight movement carried out by the mechanic), thus making a temporary connection, for rotation together, by mating cooperation of the tenon and mortice type.

The spring 9 gives utterly reliable engagement of the locking means 83, 84, not only during delivery prior to initial fitting of the rotary contactor, but also subsequently, after the steering wheel, and possibly the rotary contactor 3, have been removed, with the free end portion 83 extending into the adjacent notch 84, and in spite of any ageing of the components of the contactor 3.

The block 105 is preferably made of polyamide, so that the member 8 is flexible.

It will be appreciated that all these arrangements enable manufacture to be carried out easily by moulding of the block 105 with its member 8, the ramp means 82 of which are inclined in the axial direction going from the apex of the wedge towards the center of the contactor. The edges of the wedge are rounded or inclined.

It will be appreciated that temporary prevention of rotation is obtained between the parts 101 and 102 in a simple manner, and by adding just one additional component, namely the spring 9. In addition, the longitudinal edges of the aperture 32 constitute protective abutments, which restrict deformation of the member 8.

The presence of the spring 9 is of course not essential. In this connection, it can be arranged that the member 8 is initially inclined, in such a way that the latter is certain to make contact with the notch 84.

All this does of course depend on the material of the block 105. By choosing a suitable material, the hinge 81 is able to have, when required, the elasticity required for engagement with the notch 84.

In every case, retraction is made possible by cooperation with the steering wheel 7 (its element 72, for example the hub of the steering wheel 7), with the inclined ramp 82.

This ramp 82 enables a precise distance to be maintained between the steering wheel 7 and the member 40, in spite of inevitable manufacturing tolerances.

The inclination of the ramp 82 does of course depend on particular applications, and is determined in such a way that the blocking member 8 escapes from the notch 84, which is here of rectangular form, when the steering wheel 7 is brought down.

The present invention is of course not limited to the embodiment described. In particular, the member 8 may consist of the spring 9, which is profiled accordingly, that is to say by having a portion with a ramp 82 and a free end which is adapted to engage in the notch 84. In that case, the leaf has two branches which are joined together by, for example, a rounded portion.

This leaf has no need, in this case, to be fixed to the block 105.

It is of course possible to provide in the block a shoulder for engagement of the inner end of the branch of the spring 9 which is attached to the edge of the aperture 30. For example, it is possible to make use of the upper face of the projection 91 to form the said shoulder.

This arrangement is of course applicable for retention of the leaf 9 in FIGS. 3 and 4.

In a modification, the spring 9 may be a spring of the "clothes peg" type, made of round wire with a coil in its upper part, a ramp-shaped zone 82, and a free end portion which is adapted to mesh with the notch 84. In this case, the other end of the spring 9 is for example fixed to the block 105.

The notch 84 and the finger-shaped free end portion of the member 8 may of course be semicircular in shape, and in place of a connection of the tenon and mortice type it is possible to consider another kind of mating cooperation between the first and second members of the retractable locking device 83, 84.

For example, the member 8 may have at its free end a plurality of lugs engaging with complementary lugs which are formed locally at the outer periphery of the plate element 43 of the member 40.

In this way a ratchet type connection is obtained.

In a modification, a tilting type arrangement may be provided, with the member 8 being pivoted at its middle to the block 105. In this case, the member 8 has at one of its ends the ramp means 82 arranged to cooperate with the steering wheel 7, and at its other end a projecting peg which extends into an aperture of the flange 43 of the member 40.

Thus, as the steering wheel is fitted, the member 8 tilts and the blocking peg escapes from its associated aperture so as to unlock the two parts 101, 102.

In every case, the first member 8 is disengageably connected to the second member.

The member 8 does not necessarily extend vertically, but may be arranged horizontally.

In this connection, in FIG. 4, the member 8 would then be formed horizontally in the member 40 and would accordingly have a free end which was arranged to penetrate into at least one notch formed in the member 102, in the block 105. The steering wheel would then for example have a bar which was arranged to make contact with the ramp 82 so as to retract the latter, the said ramp being inclined going from its apex towards the outside of the switch.

In that case, it is necessary to reverse the structures, with the part 102 being fixed without being connected with the steering wheel 7, and with the member 40 being movable and coupled in rotation to the steering wheel 7, for example through a drive pin.

The notch which corresponds to the mean position of the rotary contactor could for example be formed in the terminal block which accommodates the end of the tape 6.

The notch may of course be formed somewhere else.

The stop member 8 is not necessarily carried by the block 105. It can be carried for example by a special arm or finger for the driving of the moving part by the steering wheel.

Selection of the material for the members 40 and 105 does of course depend on particular applications, and in particular on the flexibility that is required for the first member 8.

Finally it is possible to reverse the structures of FIGS. 3 and 4, with the part 102 carrying the notches 84 and being fixed accordingly, while the part 101 would be movable (i.e. coupled to the steering wheel for rotation with the latter),
and would carry the member 8 and the block 105. It is always the moving part that carries the stop member.

We claim:

1. A rotary contactor for a motor vehicle, comprising two coaxial parts (101, 102) which are mounted for movement with respect to each other, with electrical transmission means (6) being interposed between said coaxial parts, said coaxial parts comprising a fixed part (101) adapted to be fixed to the steering column (4) of the vehicle, and a moving part (102) adapted to be coupled in rotation to the steering wheel (7) of the motor vehicle, wherein, for temporary coupling of the fixed part (101) in rotation with the moving part (102), retractable locking means (83, 84) are arranged between said coaxial parts (101, 102), and in that said locking means comprise a retractable first member (8) carried by the moving part (102) and adapted to engage with a second member (40) carried by the fixed part (101), said first member comprising a manoeuvrable portion (82) adapted to be manoeuvred by the steering wheel (7) of the vehicle so as to retract said first member and release said coaxial parts from each other, and wherein the first member (8) projects from a drive block (105) orientated axially and being part of the moving part through a slot formed in the drive block, said first member being joined to the drive block (105) through a thin hinge (31).

2. A contactor according to claim 1, characterised in that the manoeuvrable portion (82) is in the form of a ramp.

3. A contactor according to claim 1, characterised in that the first member (8) is coupled releasably by mating cooperation (83, 84) with the second member (40).

4. A contactor according to claim 3, characterised in that said mating cooperation is of the tenon and mortice type.

5. A contactor according to claim 1, characterised in that the first member (8) is elastic.

6. A contactor according to claim 1, characterised in that the first member (8) is subjected to the action of a spring (9) which urges said first member towards the second member (40), so as to hold said first member in engagement with the second member.

7. A contactor according to claim 6, characterised in that said spring (9) consists of a profiled leaf which is fitted on to the fixed part (101) by hooking engagement.

8. A contactor according to claim 1, characterised in that the first member (8) has a wedge on which a ramp (82), constituting the manoeuvrable portion, is formed.

9. A contactor according to claim 8, characterised in that the free end of the first member (8) has a rectangular cross section and is adapted to extend into a complementary notch formed in the second member (40).

* * * * *